United States Patent [19]

John et al.

[11] Patent Number: 4,714,204
[45] Date of Patent: Dec. 22, 1987

[54] IMPELLER-TYPE CUTTER DRUM FOR A CHOPPER

[75] Inventors: Günter John; Karl-Heinz Kretschmer, both of Neustadt; Jürgen Röllich, Ehrenberg, all of German Democratic Rep.

[73] Assignee: VEB Kombinat Fortschritt Landmaschinen, Neustadt in Sachsen, German Democratic Rep.

[21] Appl. No.: 918,674

[22] Filed: Oct. 14, 1986

Related U.S. Application Data

[63] Continuation of Ser. No. 752,303, Jul. 3, 1985, abandoned.

[30] Foreign Application Priority Data

Jul. 4, 1984 [DD] German Democratic Rep. ... 264915

[51] Int. Cl.⁴ ............................................. B02C 18/22
[52] U.S. Cl. ..................................... 241/55; 144/172; 241/101 A; 241/101.2; 241/101.7; 241/222
[58] Field of Search ............ 241/101 R, 101 A, 101.2, 241/101.7, 221, 222, 55; 144/172

[56] References Cited

U.S. PATENT DOCUMENTS

| 2,656,868 | 10/1953 | Hintz et al. | 241/55 |
| 2,857,946 | 10/1958 | Nikkel | 241/55 |
| 3,342,230 | 9/1967 | Waldrop | 241/221 X |
| 3,713,471 | 1/1973 | Sadler | 241/221 X |
| 3,974,970 | 8/1976 | Bertrand et al. | 241/222 |
| 4,011,998 | 3/1977 | Holdeman et al. | 241/222 X |

FOREIGN PATENT DOCUMENTS

| 1154363 | 9/1983 | Canada | 241/222 |
| 955370 | 1/1957 | Fed. Rep. of Germany . | |
| 1116464 | 11/1961 | Fed. Rep. of Germany | 241/221 |
| 7609165 | 8/1976 | Fed. Rep. of Germany . | |
| 2727164 | 12/1977 | Fed. Rep. of Germany | 241/101.7 |
| 708109 | 4/1954 | United Kingdom . | |
| 840347 | 7/1960 | United Kingdom | 241/221 |
| 1523894 | 9/1978 | United Kingdom . | |
| 1570781 | 7/1980 | United Kingdom | 241/222 |
| 175778 | 10/1965 | U.S.S.R. | 241/221 |

Primary Examiner—Howard N. Goldberg
Assistant Examiner—Joseph M. Gorski
Attorney, Agent, or Firm—Karl F. Ross; Herbert Dubno

[57] ABSTRACT

An impeller-type cutter drum for a chopper has a drum body including three drum disks arranged side-by-side and supporting two rows of blade holders which are spaced about the circumference of the drum body. Each blade holder supports a chopping blade and extends between a respective one of the outer disks and the center disk upwardly in an upwardly inclined and oblique manner. The front portion of each blade holder is shaped as an impeller which is arranged at constant distance to and has corresponding inclination as the chopping blade. Each impeller has an arc-shaped deflector portion immediately adjacent the centered drum and extends in a plane approximately adapted to the plane of the drum shaft which support the disks.

13 Claims, 4 Drawing Figures

IMPELLER-TYPE CUTTER DRUM FOR A CHOPPER

This is a continuation of co-pending application Ser. No. 752,303 filed on July 3, 1985 now abandoned.

FIELD OF THE INVENTION

Our present invention refers to an impeller-type cutter drum for a chopper to comminute agricultural products, e.g. in ensilage blowers, field harvesters and the like.

BACKGROUND OF THE INVENTION

In general chopper drums are provided with blade holders which together with their blades are uniformly spaced about the circumference of the drum body in a plurality of annular rows. The blade holders are detachably connected to the drum body so that the chopped-stalk length can be modified and the number of blades arranged on the drum body can be varied.

German patent No. 955 370 describes a chopper which is provided with curved worm-like blades subdivided into segments in which these blades are counter-coiled, i.e. curved in opposite senses. The bent worm-like sections extend inward beyond the center of the drum. In addition, such choppers have vanes at both outer ends of the drum body to generate additional flow streams via respective air channels.

Such curved worm-like chopping blades as well as those with chopping blades extending obliquely to the center of the drum have the disadvantage of poor discharge of the chopped material in the center area of the drum thus causing congestions or packing of the cut material. The chopped-stalk material is thrown by the obliquely extending blades and impellers against the adjacent chopping blades and respective blade holders by which it is expelled forward out of the chopper drum. Consequently, energy losses as well as losses of crop material are suffered.

German utility model No. 76 09 165 describes a field chopper including a drum which supports continuous blades or beating bars. By providing a shovel-type formation, the chopper generates a hurling of the crop material. Associated with each second blade is an impeller which is arranged symmetrically to the blade drum and is keyed to it or fastened to the drum by wedges. According to this disclosure, the blades are provided with a lagging cutting shape and the impellers are inclined so that the crop material after being cut and supplied to the impellers is thrown off easier and in an optimum manner.

This arrangement has the disadvantage that the crop material is pushed against the sides of the drum housing especially when cutting at a sharp blade pitch. Consequently, friction is obtained resulting in energy losses. The friction along the side walls also causes a penetration of chopped material into the interior of the drum. Although the crop material will partly be carried away by the impeller, those portions of the chopped material disposed in the central zone of the drum cannot be transported off anymore.

OBJECT OF THE INVENTION

It is thus the principal object of our invention to provide an improved impeller-type cutter drum for a chopper obviating the afore-stated drawbacks.

SUMMARY OF THE INVENTION

We realize this object according to the invention by providing a drum body of three drum disks arranged in axialy spaced relation and supporting two rows of blade holders which are spaced about the circumference of the drum body and extend obliquely between the outer disks and the center disk.

Each of the blade holders is upwardly inclined to the center disk and carries a chopping blade which is thus also inclined towards the center disk.

At its front portion, each blade holder is provided with an impeller-like member which includes an arc-shaped deflecting part so as to guide the crop material from the central zone into a discharge chute of the chopper.

According to a further feature of the invention, the deflectors take about one-fourth of the entire length of the impellers and have corresponding inclination as the cutting edge of the chopping blades and are arranged at an equal distance thereto. Advantageously, the blade holders of the two rows are positioned in a staggered arrangement with opposing inclination while the blade holders of each row are spaced from each other at corresponding angular distances. In order to prevent an axial spacing in the central area, the chopping blades extend beyond the central drum disk.

We have also found to be advantageous to extend the blade holders together with their impellers beyond the outer disks so that they project above respective spoilers which are located at the outside of the outer drum disks.

Through the provision of such an impeller-type cutter drum, side friction within the discharge chute and congestion of crop material in the central area of the drum are prevented because the volumetric capacity of the impellers is increased in the central zone so that the crop material can be properly deflected into the discharge chute. This results in an energy-saving chopping and transporting of the crop material without requiring additional transport means.

By providing the blade holders in an inclined manner to the center disk and in an oblique extension, the cutting edges of the chopping blades extend from both sides in a similar manner toward the drum center so that the chopped material is deflected to the central zone of the cutter drum. Therefore, the side walls of the discharge chute will not be contacted by the chopped material.

Preferably, the deflector of the impeller takes about one-fourth of the entire length of the impeller and essentially extends in the plane of the drum shaft. By means of such enlarged deflectors, the chopped material is thrown off perpendicularly into the discharge chute. Since the deflectors are arranged in the central area of the drum zone in vicinity of both sides of the central drum disk, the chopped material is centrally guided into the discharge chute without causing any congestions.

A further advantage of the present invention resides in the fact that the continuous arrangement of the chopping blades from the outer disks of the cutter drum and the straight cutting edge provide a uniform and clear cut.

BRIEF DESCRIPTION OF THE DRAWING

The above and other features, objects and advantages of our present invention will now be described in more detail with reference to the accompanying drawing, in which.

SPECIFIC DESCRIPTION

Figure 1:
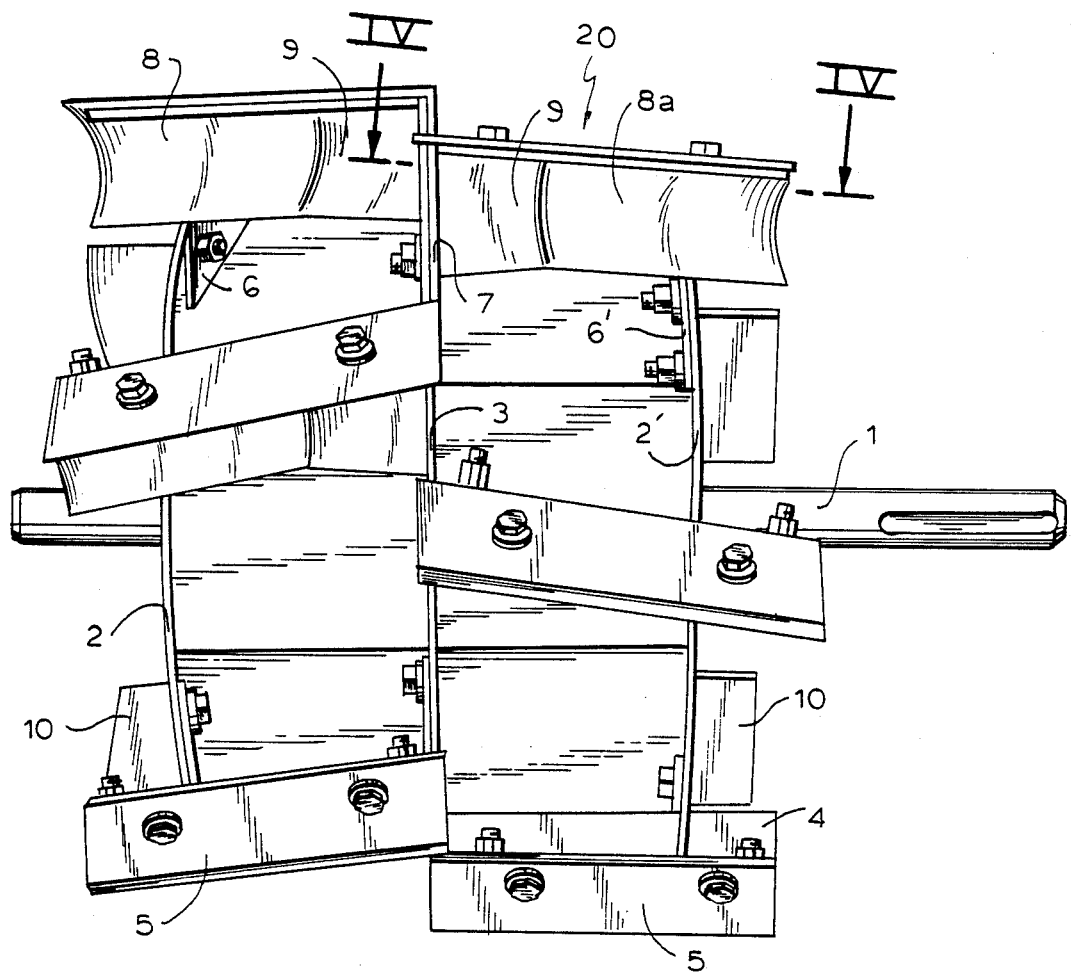
FIG. 1 is a front view of an impeller-type cutter drum according to the invention.
Figure 2:
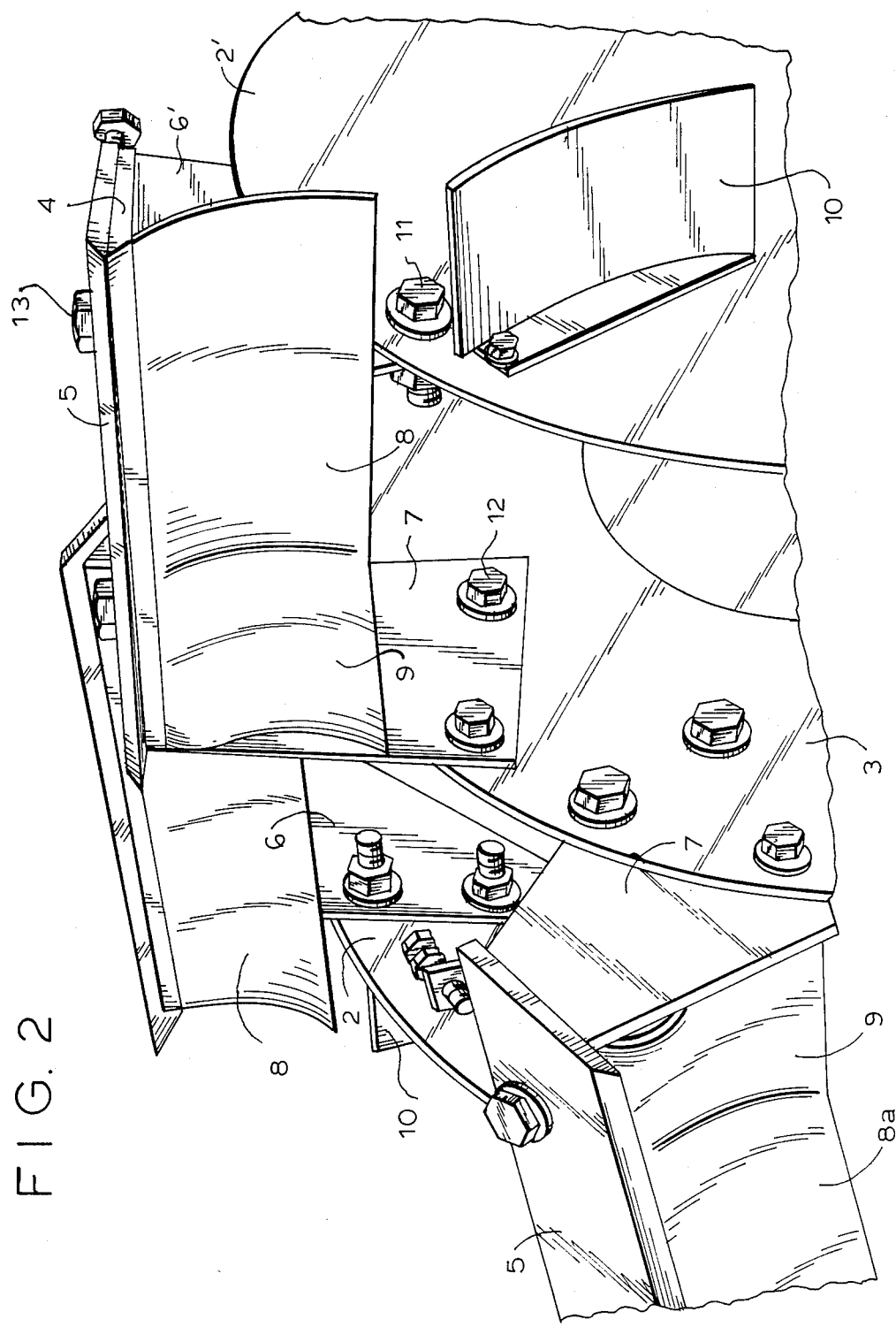
FIG. 2 is a perspective illustration of the cutter according to FIG. 1 showing in particular individual impellers.

In the drawing, there is shown a cutter drum 20 of an otherwise not shown chopper for cutting straw or stalks. The cutter drum 20 includes three drum disks 2,2',3 which are supported by a rotating shaft 1. The drum disks 2,2',3 are arranged essentially parallel to each other with the drum disk 3 centered equidistantly from the outer drum disks 2,2'. As can be especially seen from FIG. 1, the center disk 3 serves with each outer disk 2,2' as support for a plurality of blade holders 4 which are positioned in two rows along the circumference of the cutter drum 20 between the center disk 3 and the outer disk 2 as well as the center disk 3 and the outer disk 2'. The blade holders 4 of the two rows are provided in a staggered arrangement relative to each other which means that between two blade holders 4 of one row one blade holder 4 is provided in the other row.

Each blade holder 4 is provided with a top portion 4a which is elevated with respect to the outer circumference of the disks 2,2',3. The top portion 4a extends between the respective one of the outer disks 2,2' and the center disk 3 and is connected via an outer side plate 6,6' to the disk 2,2' by screws 11 and via an inner side plate 7 to the respective inner disk 2,2' by a screw connection 12. Each of the blade holders 4 is fixed to the drum disks 2,2',3 in such a manner that—viewed in radial direction to the shaft 1—its top portion 4a is inclined upward to the center disk 3 and extends obliquely relative to the latter so that the blade holders 4 of the two rows are arranged at opposing inclination to each other.

Figure 3:
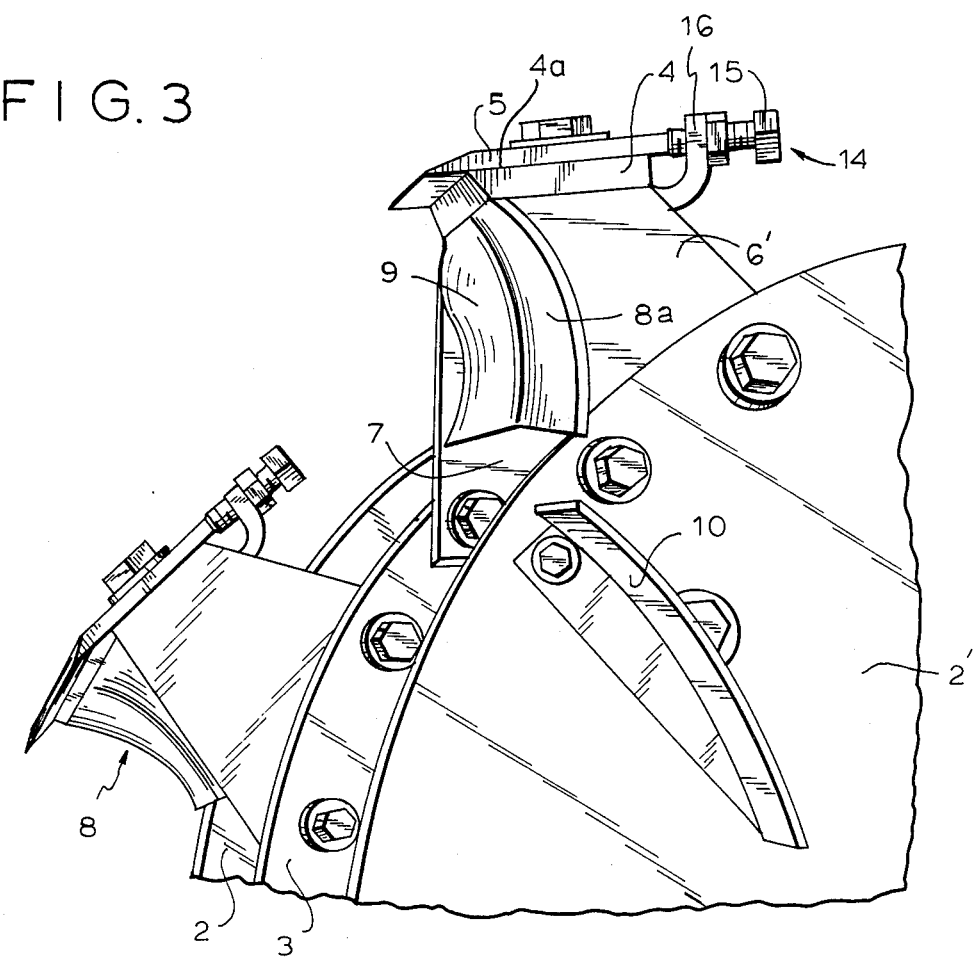
FIG. 3 is a perspective illustration of a blade holder for supporting one impeller of the cutter drum.
Figure 4:
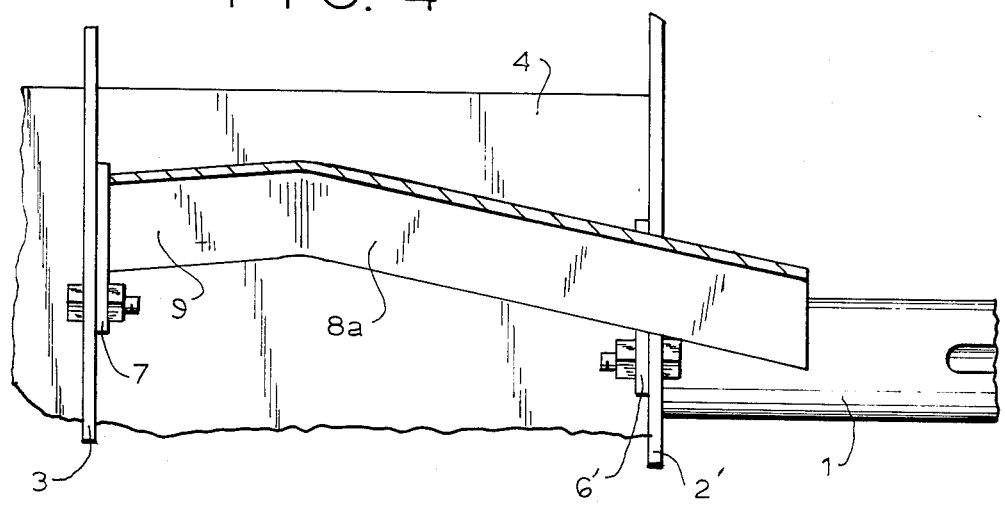
FIG. 4 is a cross-sectional view taken along the line of IV—IV of FIG. 1.

Positioned over the top portion 4a of each holder 4 is a chopper blade 5 which is detachably fixed thereto by means of screws 13 and is also upwardly inclined. Each blade 5 projects in circumferential direction of the drum body beyond the leading edge of the top portion 4a and extends in axial direction beyond the center disk 3 so as to avoid axial spacing between the rows of blades 5. As is shown in FIG. 3, the projection by which the blade extends beyond the leading edge of the top portion 4a is adjustable by a control mechanism 14 which includes a machine bolt 15 abutting with its front end against the rear edge of the blade 5 (FIG. 4). The machine bolt 15 is mounted on a bent cantilever bracket 16 whose one end is fixed to the blade holder 4 and whose other free end has an opening through which the bolt 15 projects.

The front portion of each blade holder 4 is provided as an impeller-shaped blower member or vane 8 which has the same inclination as the cutting edge of the respective chopping blade and is arranged at equal distance to the latter. Each impeller 8 which deflects chopped stalks into a discharge chute (not shown) of the chopper is divided in an outer section 8a whose end extends beyond the outer disk 2,2' and whose other end is formed to an arc-shaped deflector 9 which takes about one-fourth of the length of the entire impeller 8. The deflector 9 of the impeller 8 is arranged in vicinity of the center disk 3 and abuts against the upper rim of the side plate 7. As is shown in FIG. 4, each deflector 9 extends approximately parallel to the shaft 1 while the outer section 8 is arranged at an angle thereto.

Consequently, during cutting, chopped stalks will be forced inward by the impeller section 8a toward the discharge chute while the deflectors 9 prevent the chopped-stalks from being thrown against each other in the center zone since the deflectors 9 of the blade holders 4 direct the chopped-stalks perpendicularly in a straight plane into the central area of the discharge chute. Chopped-stalk congestions are thus avoided.

At their outer surface, the drum disks 2,2' are provided with spoilers 10 above which the outer section 8a of the impeller 8 extends so as to prevent chopped-stalks from penetrating to the outer surfaces of the not shown discharge chute.

We claim:

1. An impeller-type cutter drum for a chopper, the drum comprising:
   a drum body centered on and rotatable in one direction about an axis, and having a center drum disk generally perpendicular to the axis and right and left outer drum disks parallel to the center disk, the center disk being between the outer disks;
   respective right and left sets of holders each between its respective outer disk and the center disk, the holders being generally angularly equispaced about the disks to right and left axial sides of the center disk;
   respective straight right and left blades having cutting edges, the blades being secured to the holders and each extending from respective inner ends at the center disk to respective outer ends at its respective outer disk, the blades being angled from the center disk back to the outer disks with the inner end of each blade trailing its respective outer blade end in the direction; and
   respective right and left impeller vanes extending generally parallel to and along the blades radially inward therefrom and each having
      a respective generally straight inner portion at the center disk and having an inner end at the center disk and an outer end, each inner portion being angled forward in the direction from the respective inner-portion outer end to the respective inner-portion inner end and
      a respective generally straight outer portion at the respective outer disk, angled forward in the direction from the respective inner-portion outer end toward the respective outer disk, mainly leading the respective inner portion in the direction, about at least three times longer than the respective inner portion, and meeting the outer end of the respective inner portion at an angled junction open forward in the direction.

2. The cutter drum defined in claim 1 wherein each of said impeller vanes has an inclination generally corresponding to that of the cutting edge of its respective blade, and is arranged at a constant distance from its respective cutting edge.

3. The cutter drum defined in claim 1 wherein said center disk has an upper rim, each of said inner portions extending to said upper rim of said center disk.

4. The cutter drum defined in claim 1 wherein the blade holders of each of said sets are arranged at an essentially equal angular distance about the axis of the drum body.

5. The cutter drum defined in claim 1, further comprising fastening means for detachably mounting the blade holders to the disks.

6. The cutter drum defined in claim 1, further comprising
   a plurality of spoilers mounted on the outer drum disks, the blade holders and impeller vanes extending axially beyond their respective outer disks so as to be radially outward of said spoilers.

7. The cutter drum defined in claim 1 wherein the blade holders extend axially from the respective outer disks beyond the center drum disk so as to eliminate any axial spacing between the blade holders of the sets.

8. The cutter drum defined in claim 1 wherein said vanes each terminate at a respective plate connected to the center disk and securing the respective vane thereto.

9. The cutter drum defined in claim 8 wherein each vane extends axially outwardly past its respective outer disk and terminates axially beyond its respective outer disk.

10. The cutter drum defined in claim 9 wherein each of said holders is provided with screw means for clamping the respective blade thereon, and with screw adjusting means for positioning the cutting edge of the respective blade with respect to the respective holder.

11. The cutter drum defined in claim 10 wherein said plates are planar and parallel to said disks.

12. The cutter drum defined in claim 11 wherein the inner portions are convex in said one direction adjacent the respective holder, and the respective plate securing same to the center disk.

13. The cutter drum defined in claim 12, further comprising outer plates securing said holders to said outer disks, and curved to conform to said vanes.

* * * * *